(12) United States Patent
Tong

(10) Patent No.: US 11,996,514 B2
(45) Date of Patent: May 28, 2024

(54) POWER SUPPLY STATION AND CHARGING AND DISCHARGING METHOD THEREOF

(71) Applicant: Ningbo Zhongxin Electronic Technology Co., Ltd., Zhejiang (CN)

(72) Inventor: Mingkui Tong, Zhejiang (CN)

(73) Assignee: Ningbo Zhongxin Electronic Technology Co., Ltd., Ningbo (CN)

(*) Notice: Subject to any disclaimer, the term of this patent is extended or adjusted under 35 U.S.C. 154(b) by 360 days.

(21) Appl. No.: 17/406,090

(22) Filed: Aug. 19, 2021

(65) Prior Publication Data

US 2022/0209283 A1 Jun. 30, 2022

(30) Foreign Application Priority Data

Dec. 31, 2020 (CN) .......................... 202011635042.4

(51) Int. Cl.
*H02J 7/00* (2006.01)
*H01M 10/0525* (2010.01)
*H01M 10/42* (2006.01)
*H01M 10/44* (2006.01)
*H01M 10/613* (2014.01)
(Continued)

(52) U.S. Cl.
CPC ..... *H01M 10/0525* (2013.01); *H01M 10/425* (2013.01); *H01M 10/44* (2013.01); *H01M 10/441* (2013.01); *H01M 10/613* (2015.04); *H01M 10/627* (2015.04); *H01M 10/655* (2015.04); *H01M 10/658* (2015.04); *H01M 50/247* (2021.01); *H01M 50/251* (2021.01); *H02J 7/0013* (2013.01); *H02J 7/0042* (2013.01); *H02J 7/0044* (2013.01); *H02J 7/0045* (2013.01); *H02J 7/0063* (2013.01); *H02J 7/00712* (2020.01); *H01M 2010/4271* (2013.01); *H01M 2220/10* (2013.01)

(58) Field of Classification Search
CPC ........................... H02J 7/00712; H02J 7/0042
See application file for complete search history.

(56) References Cited

U.S. PATENT DOCUMENTS

| 2015/0091392 | A1* | 4/2015 | Hwang | ................. H02J 7/0045 |
| | | | | 307/150 |
| 2017/0259956 | A1* | 9/2017 | Hori | ....................... A45C 13/02 |

FOREIGN PATENT DOCUMENTS

| CN | 201859906 U | 6/2011 |
| CN | 204098080 U | 1/2015 |

(Continued)

*Primary Examiner* — Robert Grant

(57) ABSTRACT

The present application relates to a power supply station and a charging and discharging method thereof, and relates to the technical field of energy sources. The power supply station includes a base assembly to be placed on a plane, and configured to mount an end cap assembly and a connecting assembly; a connecting assembly disposed on the base assembly, configured to insert a lithium battery pack therein and electrically connect the lithium battery pack, and configured to distribute energy from the lithium battery pack; the lithium battery pack, slidably connected to the connecting assembly, and configured to provide electrical energy; the end cap assembly, disposed on the base assembly, and configured to fix the connecting assembly; a locking assembly, disposed on the connecting assembly, and configured to lock the lithium battery pack; and an illumination assembly disposed on the end cap assembly and configured for illumination.

18 Claims, 17 Drawing Sheets

(51) Int. Cl.
*H01M 10/627* (2014.01)
*H01M 10/655* (2014.01)
*H01M 10/658* (2014.01)
*H01M 50/247* (2021.01)
*H01M 50/251* (2021.01)

(56) References Cited

FOREIGN PATENT DOCUMENTS

| | | |
|---|---|---|
| CN | 206195372 U | 5/2017 |
| CN | 109166994 A | 1/2019 |
| CN | 110350622 A | 10/2019 |
| CN | 212063535 U | 12/2020 |

\* cited by examiner

POWER SUPPLY STATION AND CHARGING AND DISCHARGING METHOD THEREOF

CROSS-REFERENCE TO RELATED APPLICATION

The present application is based on and claims the priority benefits of China application No. 202011635042.4, filed on Dec. 31, 2020. The entirety of the above-mentioned patent application is hereby incorporated by reference herein and made a part of this specification.

BACKGROUND

Technical Field

The present application relates to the technical field of energy sources, and in particular, to a power supply station and a charging and discharging method thereof.

Description of Related Art

A lithium battery pack is an integral which integrates a plurality of lithium batteries to achieve centralized charging and discharging. A power supply station is a device for placing and mounting a battery pack so as to realize power supply.

In the related art, a lithium battery pack is fixed to a corresponding housing by bolts, and once the lithium battery pack is replaced, a worker is required to carry a tool and use the tool to remove the bolt, then replace the lithium battery pack, and finally fix the lithium battery pack again.

In the related art described above, when a bolt fixing manner is adopted, a replacement person needs to carry a tool to operate the bolt, and the assembly difficulty is large, and there is room for improvement.

SUMMARY

The present application provides a power supply station and a charging and discharging method thereof.

In a first aspect, the present application provides a power supply station, which reduces the difficulty of assembling a lithium battery pack, and adopts the following technical solutions:

A power station includes:
- a base assembly, configured to mount an end cap assembly and a connecting assembly;
- the connecting assembly, disposed on the base assembly, configured to insert the lithium battery pack therein and electrically connect the lithium battery pack, and configured to distribute energy from the lithium battery pack;
- the lithium battery pack, slidably connected to the connecting assembly, and configured to provide electrical energy;
- the end cap assembly, disposed on the base assembly, and configured to fix the connecting assembly; and
- a locking assembly, disposed on the connecting assembly, and configured to lock the lithium battery pack.

By adopting the above technical solutions, the power supply station is stably placed by the base assembly, the connecting assembly is provided to mount the lithium battery pack, and fixed by the locking assembly, the base assembly cooperates with the end cap assembly to fix the whole power supply station, thereby facilitating assembly.

In a second aspect, the present application provides a charging and discharging method of the power supply station, which improves the use safety of the power supply station, improves the service life, and adopts the following technical solutions:

A charging and discharging method of the power supply station described above, further including the following steps of:
- acquiring current electric quantity information of each lithium battery in the current lithium battery pack and charging and discharging state information of the current lithium battery pack;
- sorting the current electric quantity information according to the electric quantity to obtain a lithium battery corresponding to the highest electric quantity; and
- charging or powering the lithium battery corresponding to the highest electric quantity according to the charging and discharging state;
- if a plurality of lithium batteries corresponding to the highest electric quantity are provided, then sorting charging or discharging time points of the lithium batteries, and preferentially charging and discharging the lithium battery with the longest time point from the current time point.

By adopting the above technical solutions, by detecting each lithium battery and knowing the electric quantity thereof, the lithium battery in the lithium battery pack is controlled for charging and discharging by matching with the use state, and at the same time heat generation is reduced, the use safety is improved, and the service life is also improved.

DESCRIPTION OF THE EMBODIMENTS

In order to make the objectives, technical solutions, and advantages of the present application clearer, the present application will be further described in detail below with reference to FIGS. 1-17 and embodiments. It should be understood that the specific embodiments described herein are merely intended to explain the present application and are not intended to limit the present application.

Figure 1:
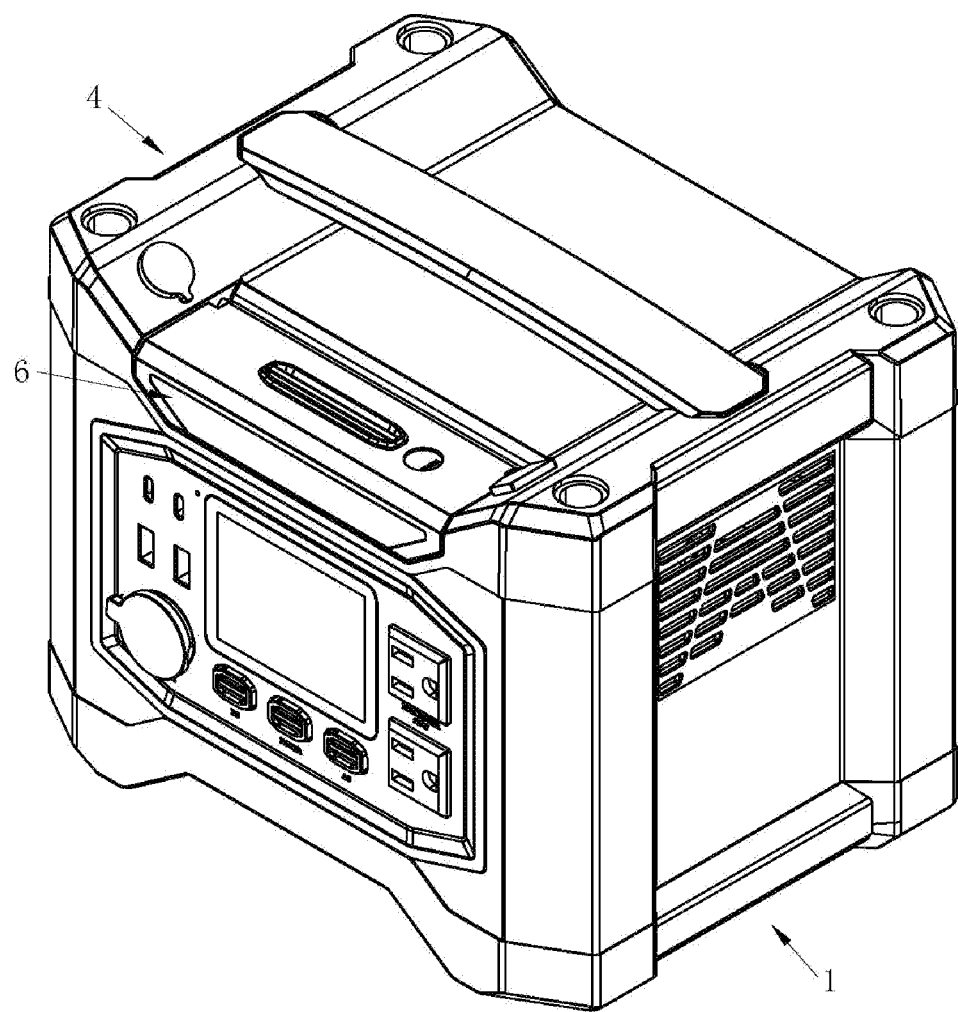
FIG. 1 is a schematic structural diagram of a lithium battery pack.
Figure 2:
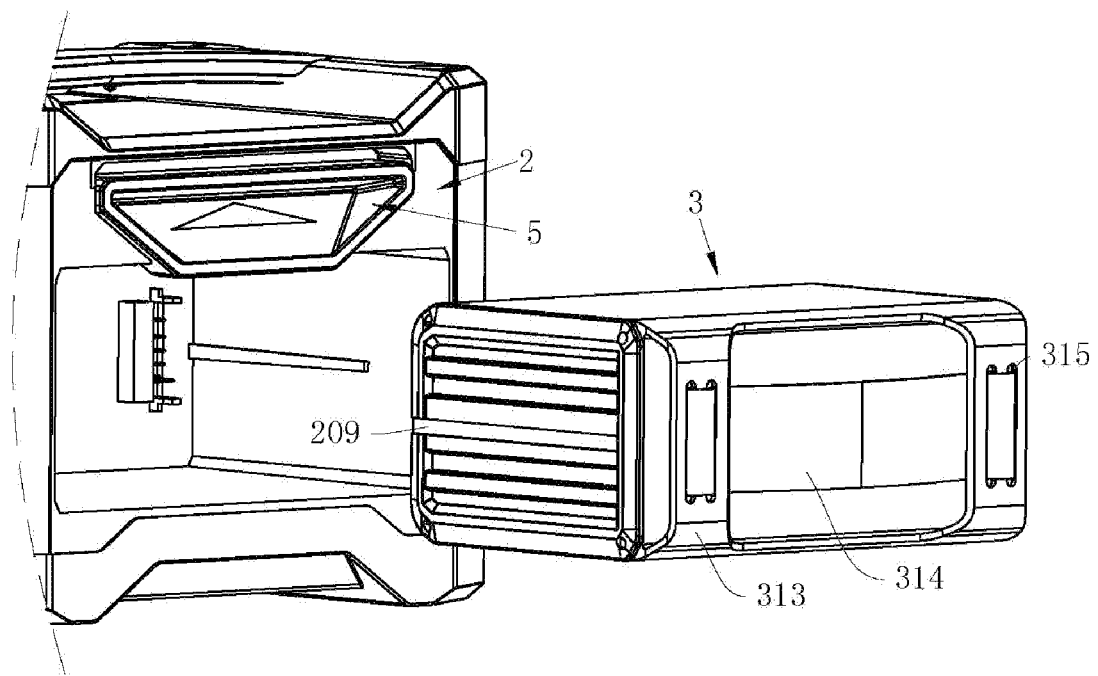
FIG. 2 is a mounting schematic diagram of a lithium battery pack and a connecting assembly.

Referring to FIGS. 1 and 2, embodiments of the present application provide a power supply station, which includes a base assembly 1, a connecting assembly 2, a lithium battery pack 3, an end cap assembly 4, a locking assembly 5 and an illumination assembly 6. The base assembly 1 is configured to be placed on a plane, and the base assembly 1 is configured to mount the end cap assembly 4 and the connecting assembly 2 therein. The connecting assembly 2 is mounted on the base assembly 1 and configured to insert the lithium battery pack 3 therein and electrically connect the lithium battery pack 3, and the connecting assembly 2 is configured to distribute energy from the lithium battery pack 3. The lithium battery pack 3 is slidably connected to the connecting assembly 2 and configured to provide electrical energy and store the electric energy. The end cap assembly 4 is mounted on the base assembly 1, and configured to fix the connecting assembly 2. The locking assembly 5 is mounted on the connecting assembly 2, and configured to lock the lithium battery pack 3. The illumination assembly 6 is mounted on the end cap assembly 4, and configured for illumination.

Figure 3:
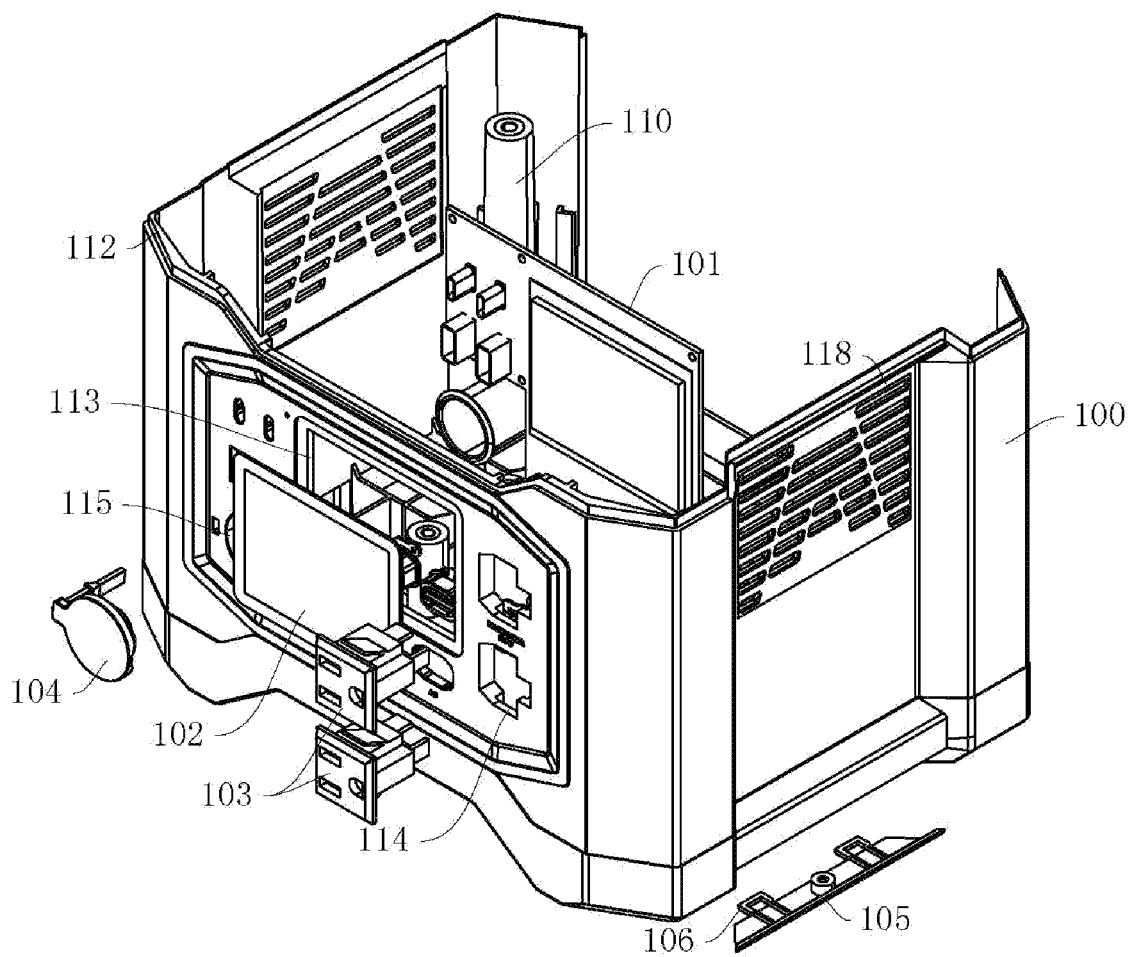
FIG. 3 is a first mounting schematic diagram of a base assembly.
Figure 4:
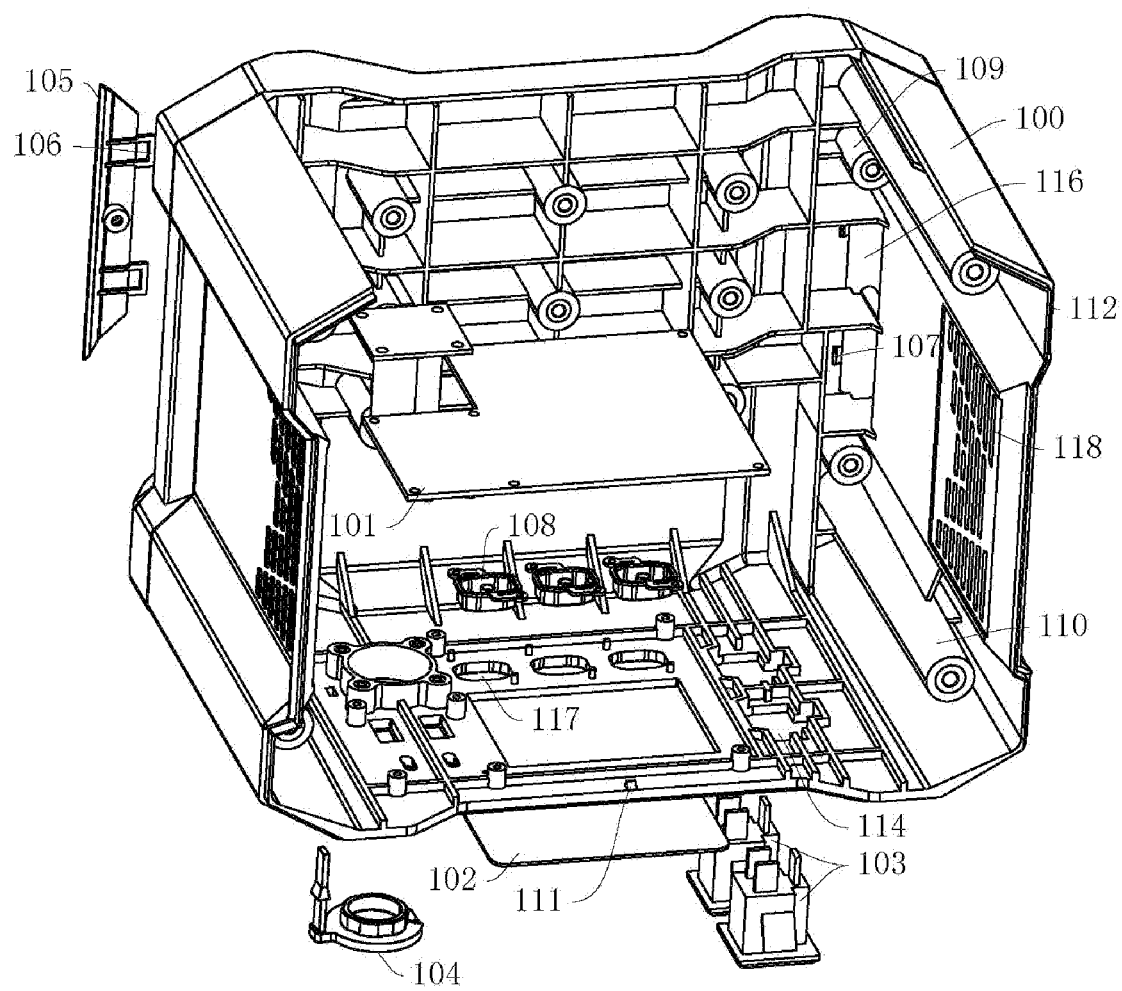
FIG. 4 is a second mounting schematic diagram of a base assembly.

Referring to FIGS. 3 and 4, the base assembly 1 includes a base shell 100, a display panel, a base bottom sheet 105, a base snap ring 106, a base snap block 107, a base button 108, a base connecting cylinder 109, a base fixing cylinder 110, a base buckle 111, and a base insertion edge 112. The display panel includes a base circuit board 101, a light-transmitting cover 102, a base plug 103 and a base dust cover 104.

The base shell 100 is configured to mount the connecting assembly 2 and the end cap assembly 4 therein. The base circuit board 101 is positioned on one side of the base shell 100 close to the lithium battery pack 3. The base circuit board 101 is connected to components such as a display screen and a button, and is mounted according to the actual situation of a worker.

The base shell 100 is provided with a light-transmitting hole 113 for mounting a display screen, and a light-transmitting cover 102 for covering the light-transmitting hole 113 is fixed on the base by glue, and the light-transmitting cover 102 is mounted on one side of the base shell 100 away from the lithium battery pack 3. The base shell 100 is snap fixed to a base plug 103. The base shell 100 is provided with a base snap slot 114 for snap-fitting the base plug 103. The base plug 103 is electrically connected to the base circuit board 101, remaining conductive, and configured to obtain electric energy from the lithium battery pack 3 for use by an external electric appliance.

A socket is further connected to the base circuit board 101, and a base connecting hole 115 for communicating with the base circuit board 101 is further provided on the base shell 100, so as to be connected with an external wire, and a base dust cover 104 for covering the base connecting hole 115 is snap fixed to the base shell 100.

A button welded on the base circuit board 101 is matched with the base button 108, and the base shell 100 is provided with a base sliding hole 117 for sliding and limiting the base button 108. The base shell 100 is provided with a heat dissipating hole 118 for communicating with the outside, thereby improving the internal heat dissipation capability.

Base bottom sheets 105 are symmetrically mounted on one side of the base shell 100 close to a plane for placement, the base bottom sheet 105 is disposed on one side of the base shell 100 away from the end cap assembly 4, and a base slot 116 for inserting the base bottom sheet 105 is disposed on the base shell 100. Base snap rings 106 are symmetrically disposed on one side of the base bottom sheet 105 close to the base shell 100, and a base snap block 107 snap-fitted with the base snap ring 106 is integrally disposed on the base shell 100. After the two are pre-fixed and snapped, the two are further fixed by bolts, thereby improving the overall stability.

Figure 5:
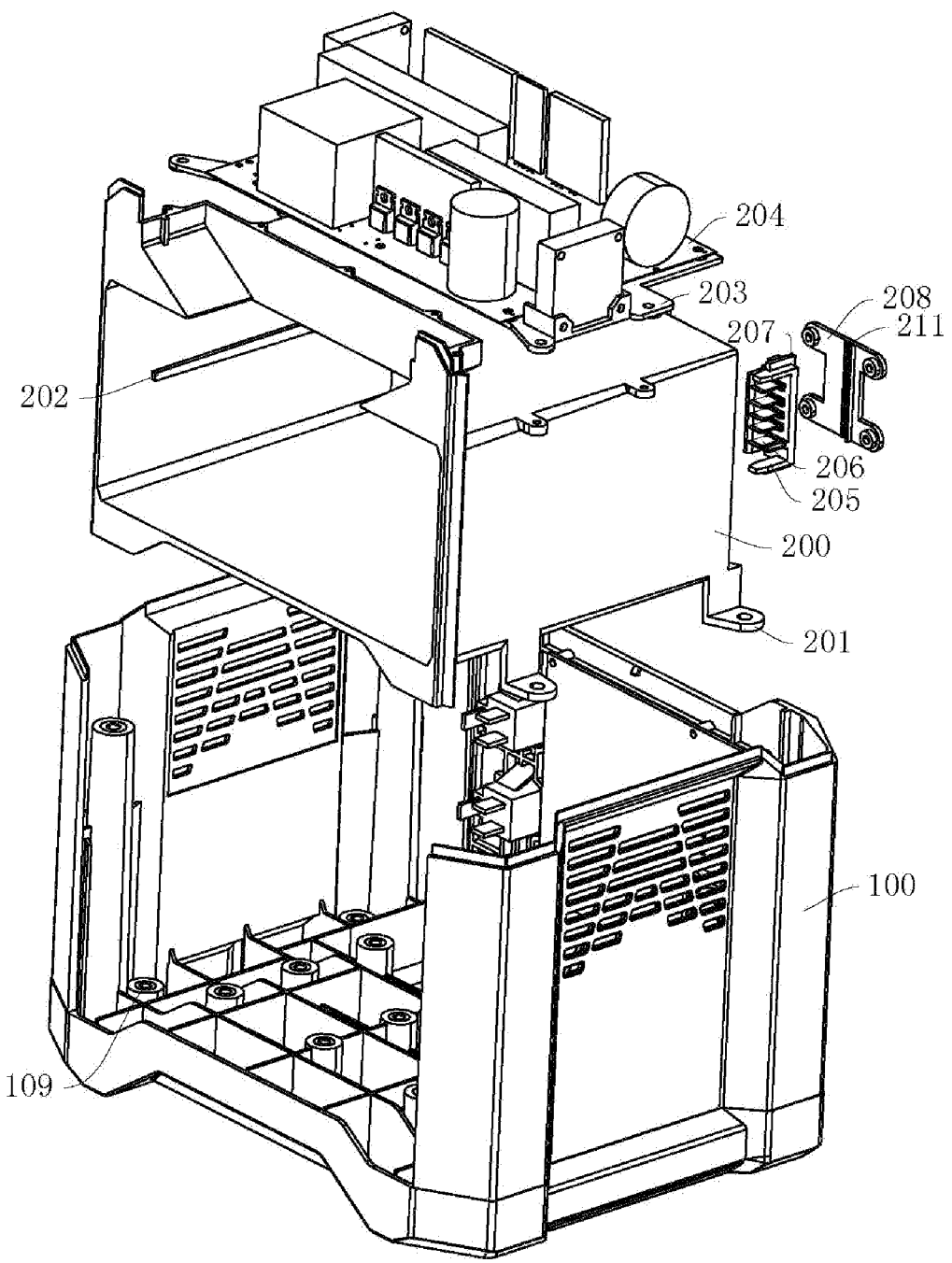
FIG. 5 is a first mounting schematic diagram of a connecting assembly.
Figure 6:
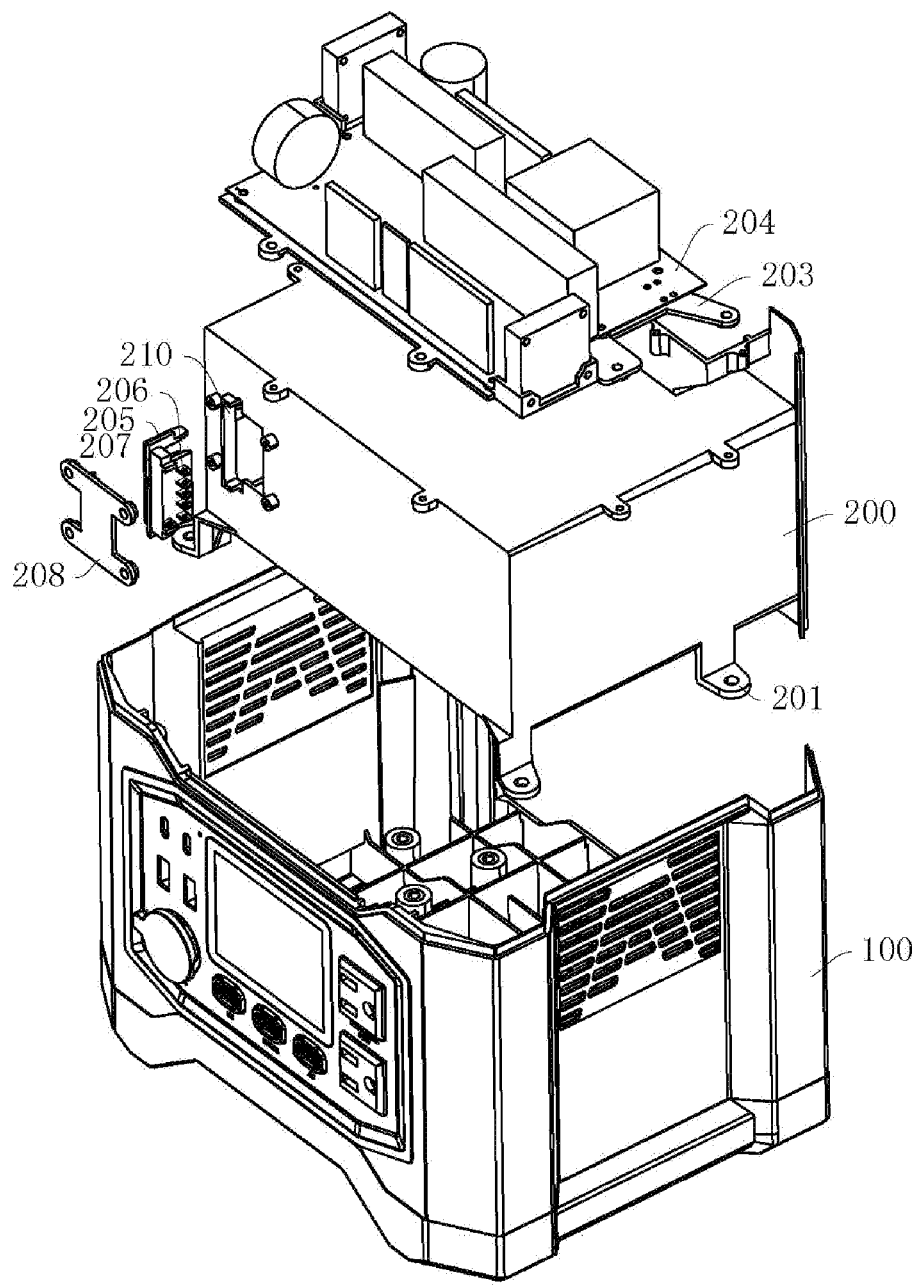
FIG. 6 is a second mounting schematic diagram of a connecting assembly.

Referring to FIGS. 5 and 6, the connecting assembly 2 includes a connecting box 200, a connecting pin 201 and a conductive assembly. The conductive assembly includes a connecting slider 202, a connecting board 203, a connecting circuit board 204, a connecting plug 205, a connecting conductive sheet 206, a connection positioning strip 207 and a connecting mounting cover 208.

The connecting box 200 is configured to insert and mount the lithium battery pack 3 therein, and a plurality of connecting pins 201 are integrally disposed on the connecting box 200. In FIG. 4, a plurality of base connecting cylinders 109 are integrally disposed on the base shell 100, and the connecting pins 201 and the base connecting cylinders 109 are fixed by bolts. Connecting sliders 202 are symmetrically disposed on the inner side wall of the connecting box 200, and sliding connection grooves 209 for inserting and sliding the connecting slider 202 therein are disposed on both sides of the lithium battery pack 3 in FIG. 2.

The upper end of the connecting box 200 is fixed to the connecting board 203 by bolts, and the connecting board 203 and the connecting circuit board 204 are also fixed by bolts, thereby fixing the connecting circuit board 204 to the connecting box 200 through the connecting board 203.

A connecting plug 205 is mounted on one side of the connecting box 200 away from the lithium battery pack 3, and the connecting box 200 is provided with a connecting receptacle 210 for inserting and limiting the connecting plug 205. The connecting plug 205 is fitted with a connecting conductive sheet 206, and the connecting conductive sheet 206 and the lithium battery pack 3 communicate with each other, thereby realizing electrical conduction.

A connection mounting cover 208 for covering the connecting plug 205 is further mounted on the mounting box, a connection positioning strip 207 is integrally provided on one side of the connecting plug 205 away from the connecting box 200, and a connection positioning groove 211 for mounting the connection positioning strip 207 is provided on the connection mounting cover 208.

Figure 7:
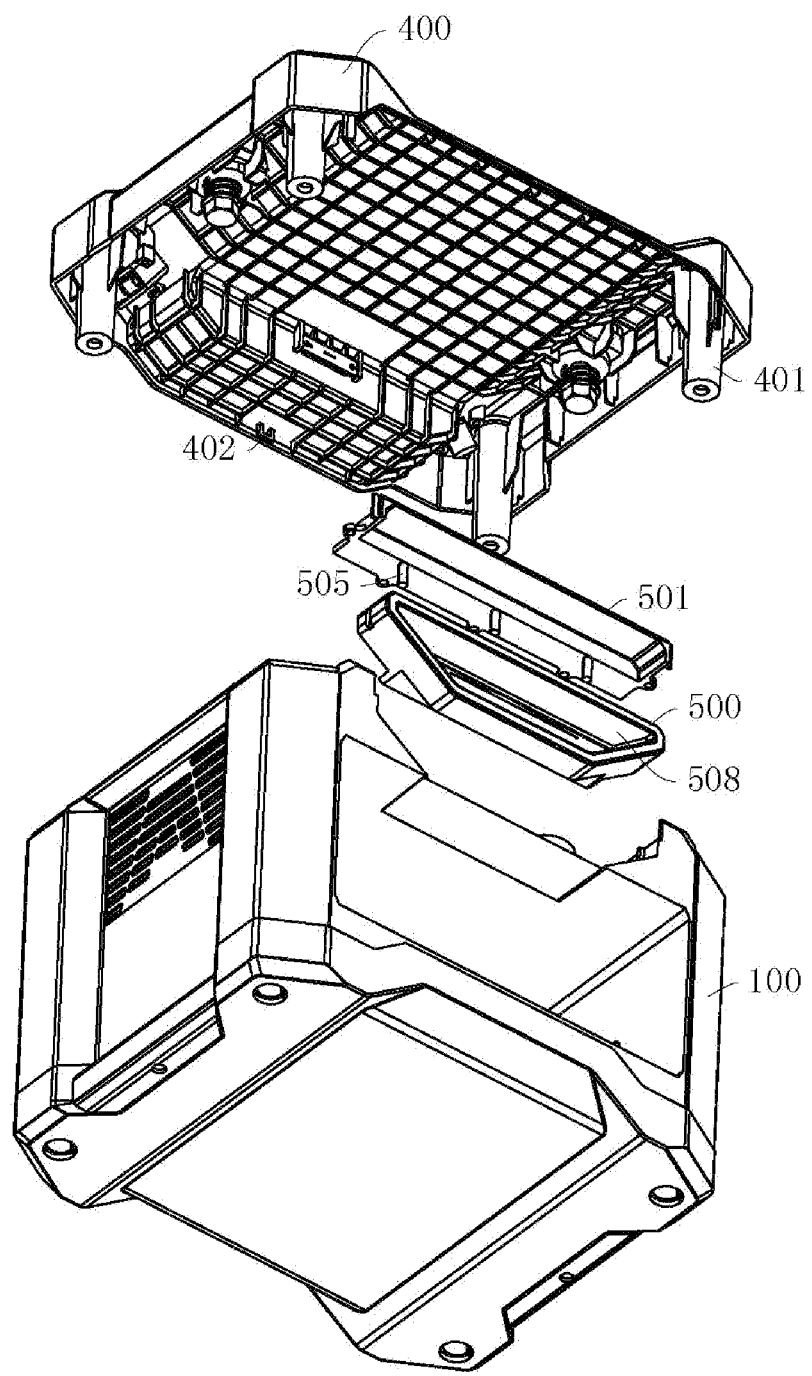
FIG. 7 is a first mounting schematic diagram of a locking assembly.
Figure 8:
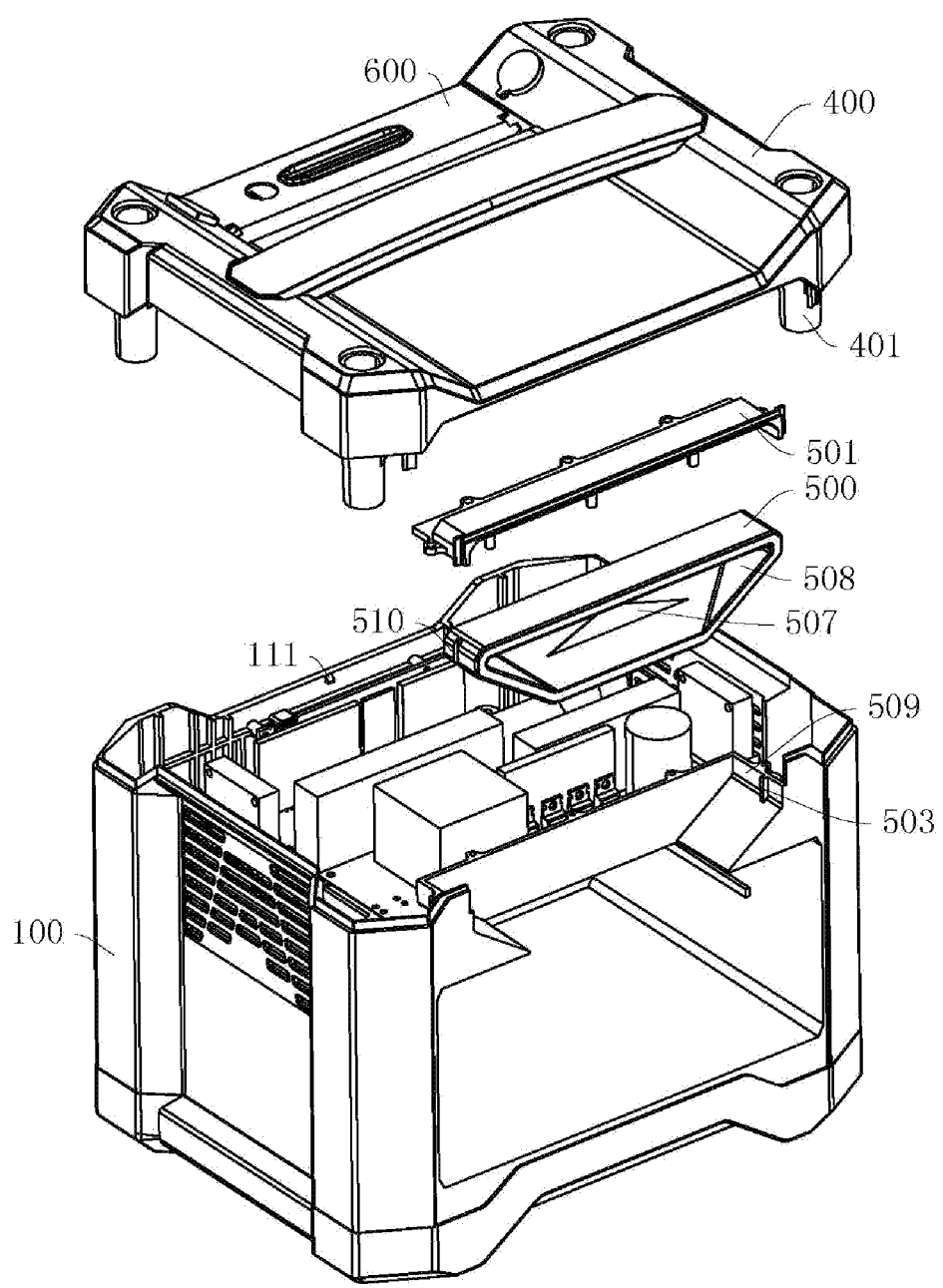
FIG. 8 is a second mounting schematic diagram of a locking assembly.

Referring to FIGS. 7 and 8, the end cap assembly 4 includes an end shell 400, an end cap fixing cylinder 401, an end cap snap block 402, an end cap charging head 403, an end cap mounting plate 404, an end cap positioning post 405, an end cap mounting box 406, and an end cap plug 407.

A plurality of end cap fixing cylinders 401 are integrally disposed on the end shell 400. In FIG. 4, the base fixing cylinders 110 integrally disposed on the base shell 100 are in one-to-one correspondence with the end cap fixing cylinders 401, so as to be fixedly connected by bolts. In FIG. 4, the base insertion edge 112 integrally disposed on the base shell 100 is inserted into the end shell 400, for further fixing. In FIG. 4, the base buckle 111 disposed on the side of the base shell 100 close to the end cap assembly 4 and the end cap snap block 402 on the end shell 400 are snap-fitted with each other, thereby implementing preliminary fixing.

Figure 9:
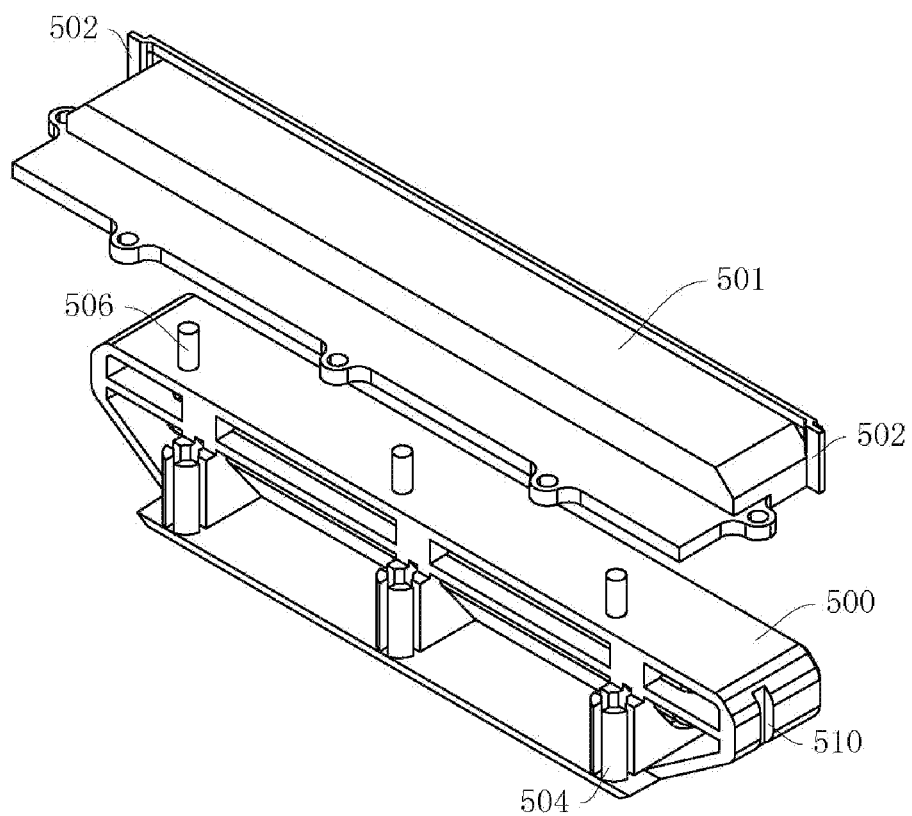
FIG. 9 is an exploded schematic diagram of a locking assembly.

Referring to FIGS. 8 and 9, the locking assembly 5 includes a locking block 500, a locking cover 501, a locking tab 502, a locking slider 503, a locking sliding cylinder 504, a locking sliding column 505, a locking pressure spring 506, and a locking indicator block 507.

The locking block 500 slides on the base shell 100 and locks the lithium battery pack. The locking sliders 503 symmetrically disposed on the base shell 100 are positioned in a locking sliding groove 509, and the locking block 500 is provided with a movement locking groove 510 for the locking slider 503 to slide up and down.

A locking cover 501 for limiting the sliding position of the locking block 500 is fixed to the base shell 100 by bolts, locking tabs 502 for mutually limiting the base shell 100 are disposed on the two sides of the locking cover 501. A locking sliding cylinder 504 is integrally disposed on the locking block 500, and the locking sliding cylinder 504 is configured to mount the locking pressure spring 506 and configured to insert and slide a locking sliding column 505.

A gripping groove 508 is provided on one side of the locking block 500 close to the base shell 100, and a locking indicator block 507 for indicating that the locking block 500 is disengaged from the locking direction of the lithium battery pack 3 is integrally provided in the gripping groove 508 on the locking block 500.

When the lithium battery pack 3 is taken out, the locking block 500 slides upwards and is lifted, the lithium battery pack 3 and the locking block 500 are disengaged from a snap-fitted state, and the lithium battery pack 3 can be taken out at the moment; When the lithium battery pack 3 is mounted, the lithium battery pack 3 is directly inserted into the base shell 100, and the locking block 500 and the lithium battery pack 3 are snap fixed under the action of downward pressure of the locking pressure spring 506.

Figure 10:
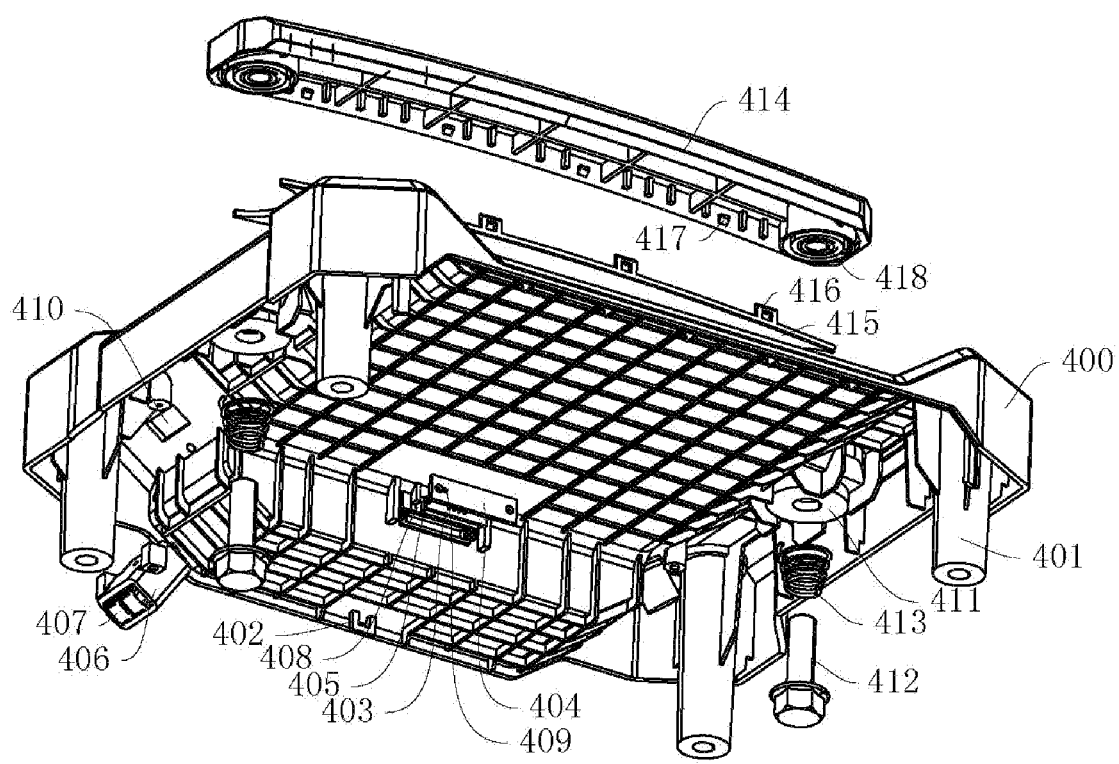
FIG. 10 is a first mounting schematic diagram of an end cap assembly.
Figure 11:
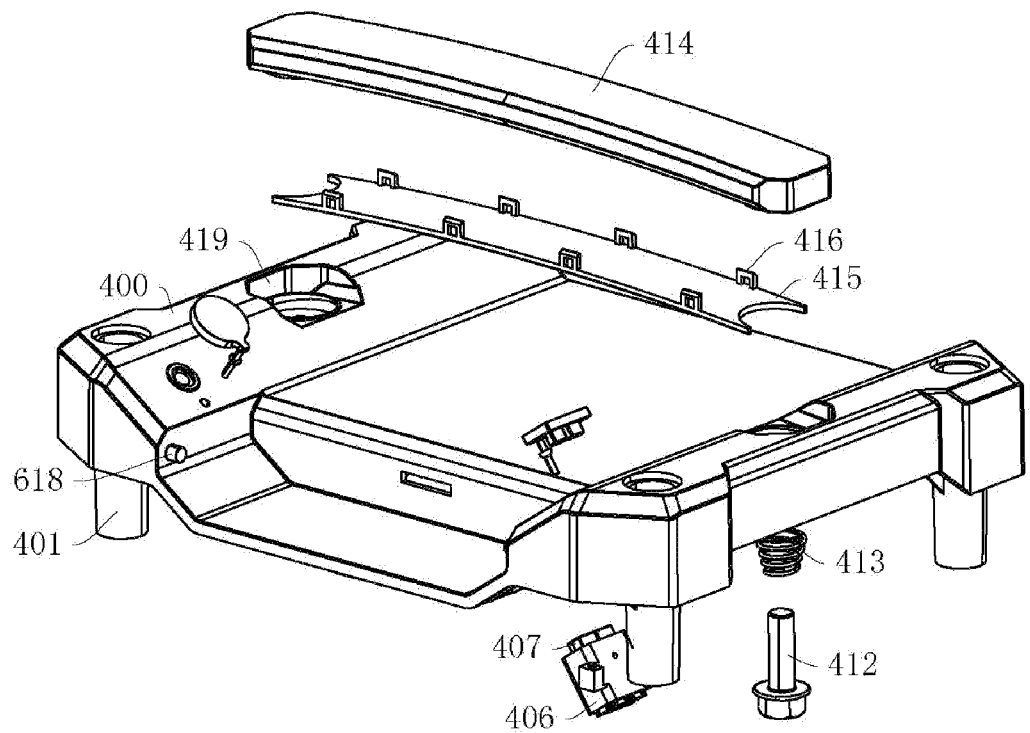
FIG. 11 is a second mounting schematic diagram of an end cap assembly.

Referring to FIGS. 10 and 11, the end shell 400 is provided with an end cap charging head 403 for charging the lithium battery pack 3, and the end shell 400 is provided with an end cap mounting slot 408 for inserting and limiting the end cap charging head 403. Furthermore, an end cap mounting plate 404 is mounted on one side of the end shell 400 close to the end cap charging head 403, and the end cap mounting plate 404 is used for pressing and fixing the end cap charging head 403.

The end cap charging head 403 is integrally provided with an end cap positioning post 405 on one side close to the end cap mounting plate 404, and the end cap mounting plate 404 is provided with an end cap through hole 409 through which the end cap positioning post 405 penetrates, and finally is fixed by bolts.

One side of the end shell 400 close to the base shell 100 is fixed with an end cap mounting box 406 by bolts, and an end cap plug 407 connected to the connecting circuit board 204 is mounted in the end cap mounting box 406, so as to provide energy, and an end cap receptacle 410 for inserting the end cap plug 407 is provided on the end shell 400.

One side of the end shell 400 close to the base shell 100 is integrally provided with an end cap connecting base 411, a lower end of the end cap connecting base 411 is provided with an end cap pressure spring 413, an end cap connecting bolt 412 is penetrated through the end cap connecting base 411, and the end cap pressure spring 413 is sleeved on the end cap connecting bolt 412, and the end cap pressure spring 413 presses and abuts against the end cap connecting bolt 412 and the end cap connecting base 411, respectively.

An end cap handle 414 is further provided on the end shell 400, a handle mounting seat 418 is integrally provided on the end cap handle 414, and the end cap connecting bolt 412 is in threaded fit with the handle mounting seat 418, so that the end cap pressure spring 413 is compressed when the end cap handle 414 is pulled upwards.

An end cap handle plate 415 is mounted on one side of the end cap handle 414 close to the end shell 400, a handle buckle 416 is integrally disposed on one side of the end cap handle plate 415 close to the end cap handle 414, and a handle snap block 417 is integrally disposed on the end cap handle 414 and fixed to the handle buckle 416. An end cap placement groove 419 for mounting an end cap handle 414 is further provided on one side of the end shell 400 away from the base assembly 1.

Figure 12:
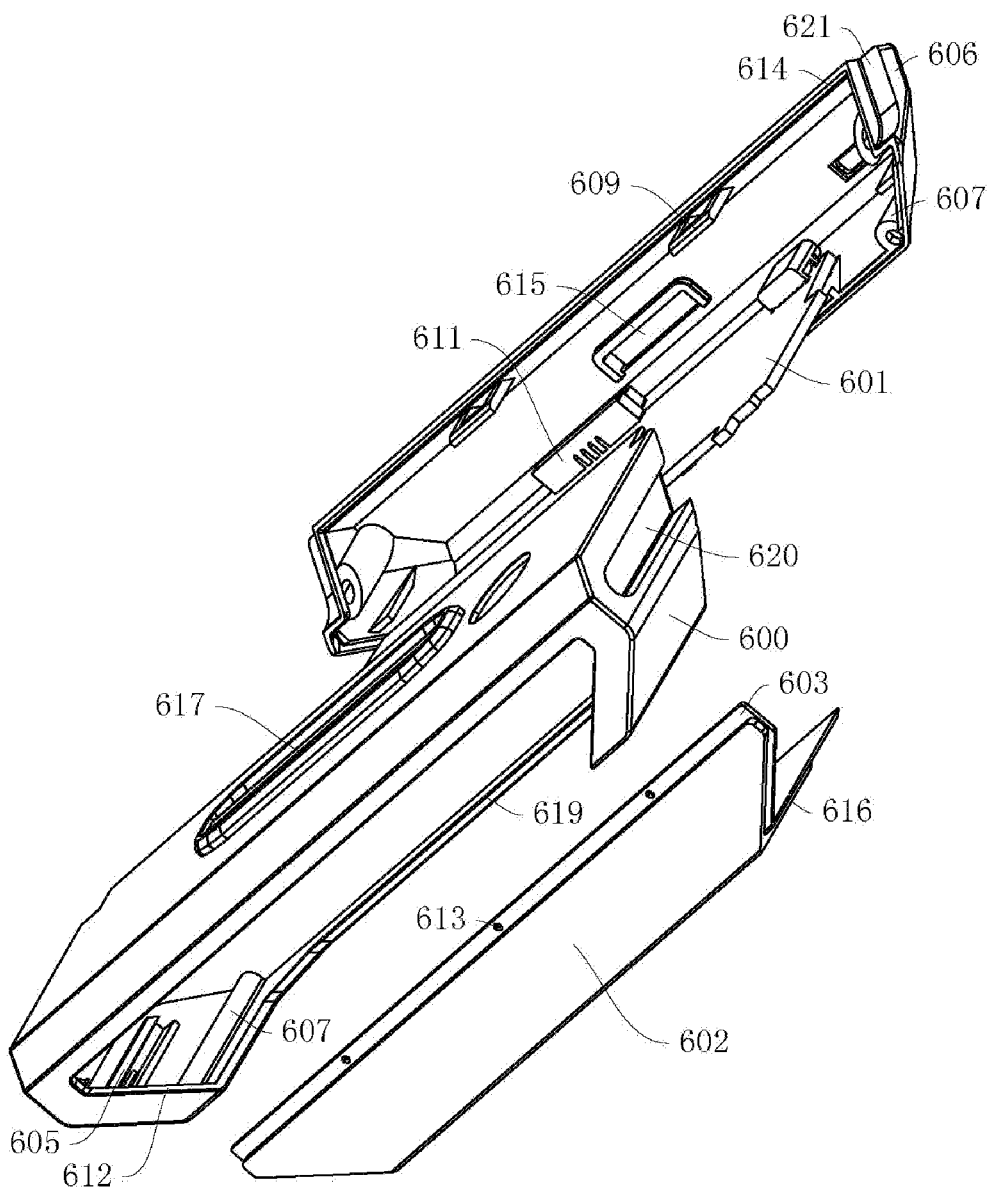
FIG. 12 is a first mounting schematic diagram of an illumination assembly.
Figure 13:
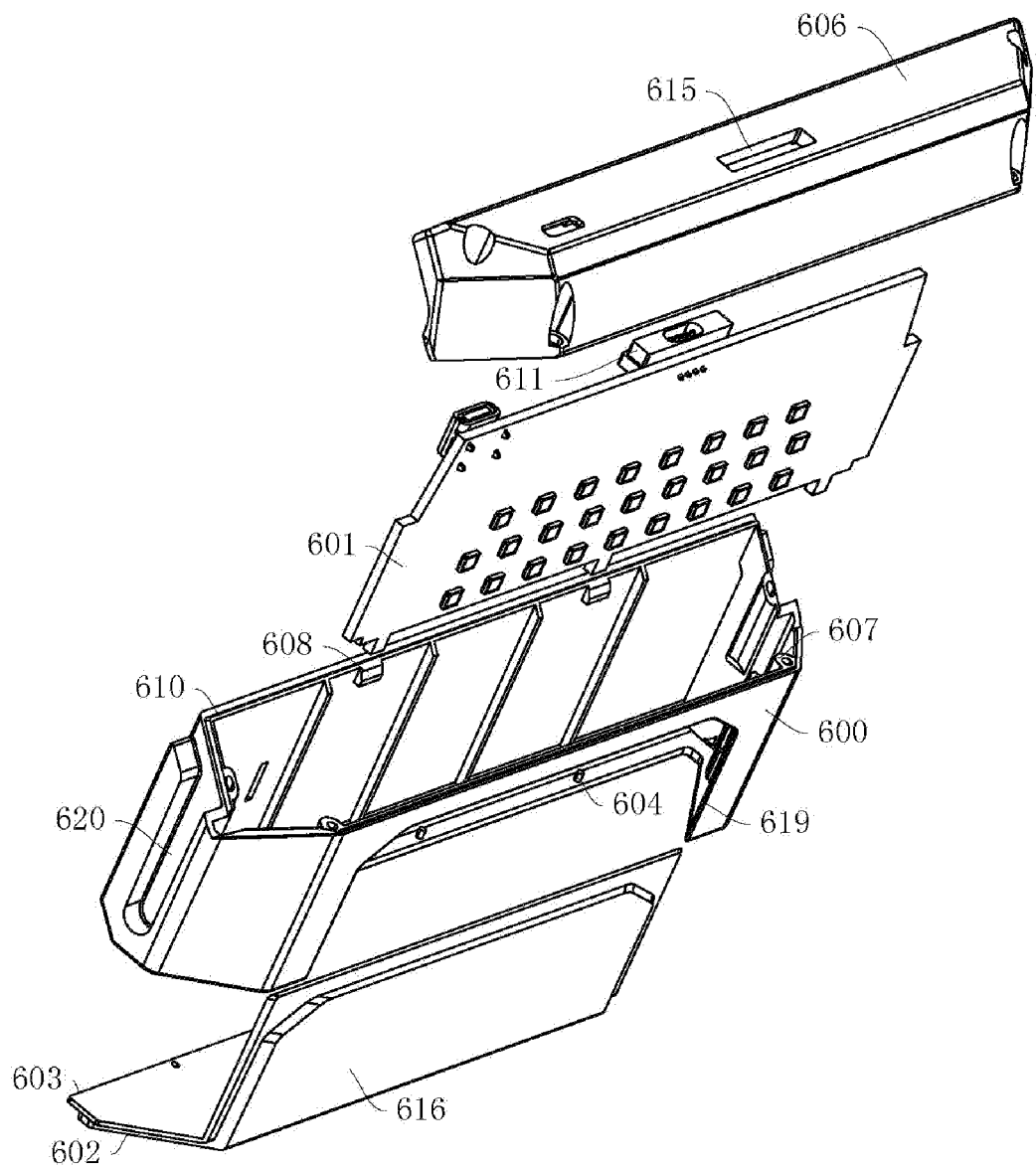
FIG. 13 is a second mounting schematic diagram of an illumination assembly.

Referring to FIGS. 12 and 13, an illumination lamp includes an illumination housing 600, an illumination circuit board 601, a first light-transmitting sheet 602, an illumination fixing sheet 603, an illumination positioning post 604, an illumination insertion sheet 605, a rear illumination cover 606, an illumination threaded cylinder 607, an illumination buckle 608, an illumination snap ring 609.

The illumination circuit board 601 is configured to mount electronic components such as a light bar and a battery, and the illumination housing 600 is provided with a first irradiation port 612 for irradiating forward, the illumination housing 600 is provided with a second irradiation port 619 for irradiating downward, and the first irradiation port 612 and the second irradiation port 619 communicate with each other.

The illumination housing 600 is provided with a first light-transmitting sheet 602 for covering the first irradiation port 612, the illumination housing 600 is provided with a second light-transmitting sheet 616 for covering the second irradiation port 619, and the first light-transmitting sheet 602 and the second light-transmitting sheet 616 are integrally disposed. Furthermore, both the first light-transmitting sheet 602 and the second light-transmitting sheet 616 are provided with an illumination fixing sheet 603, the illumination fixing sheet 603 surrounds the first light-transmitting sheet 602 and the second light-transmitting sheet 616, and the illumination fixing sheet 603 is erected and fixed on the first illumination port 612 and the second illumination port 619 so as to abut against and be limited by the illumination housing 600.

An illumination positioning post 604 is integrally disposed on one side of the illumination housing 600 close to the first irradiation port 612, and a plurality of illumination positioning posts 604 are disposed, and the illumination fixing sheet 603 is provided with an illumination positioning hole 613 for penetrating through the illumination positioning post 604. The illumination housing 600 and the illumination fixing sheet 603 are fixed by ultrasonic welding.

An illumination insertion sheet 605 for mounting the illumination circuit board 601 is integrally disposed on one side of the illumination housing 600 close to the first irradiation port 612, and the illumination insertion sheets 605 are symmetrically disposed, and after the illumination positioning post 604 and the illumination positioning hole 613 are fitted, the illumination insertion sheet 605 inserts the illumination circuit board 601 for fixation, so that the overall installation stability is improved.

An illumination socket 611 is further connected to the illumination circuit board 601. The rear illumination cover 606 is provided with an illumination through hole 615 for the illumination socket 611 to be mounted, and the user can connect a USB data line with the illumination socket 611 through the illumination through hole 615, thereby charging the illumination circuit board 601.

An illumination connecting edge 610 is further integrally arranged on the side, close to the rear illumination cover 606, of the illumination housing 600, an illumination connecting groove 614 for the illumination connecting edge 610 to be inserted into is formed in the rear illumination cover 606, and after the illumination connecting edge 610 is matched with the illumination connecting groove 614, the rear illumination cover 606 and the illumination housing 600 are matched with each other, so that the aesthetics of the appearance is improved.

The illumination housing 600 is further integrally provided with an illumination buckle 608, and the illumination buckle 608 is disposed in the side the illumination housing 600 away from the ground, and the rear illumination cover 606 is further integrally provided with an illumination snap ring 609 for snapping and fixing the illumination housing 600 and the rear illumination cover 606, so as to fix the illumination housing 600 and the rear illumination cover 606.

The illumination threaded cylinder 607 on the rear illumination cover 606 is paired with the illumination threaded cylinder 607 on the illumination housing 600 one by one, and after the rear illumination cover 606 and the illumination housing 600 are brought into contact with each other and closed, a bolt is screwed to fit onto the illumination threaded cylinder 607 to fix the rear illumination cover 606 and the illumination housing 600.

An illumination handle 617 is also integrally disposed on one side of the illumination housing 600 away from the ground, and the illumination handle 617 is disposed on the illumination housing 600 and facilitates overall displacement of the illumination lamp in the power station.

Referring to FIG. 11, illumination connection posts 618 are symmetrically disposed outside the illumination housing 600, and a first illumination sliding groove 620 for sliding the illumination connection post 618 is disposed on the illumination lamp, that is, the first illumination sliding groove 620 is positioned on the illumination housing 600.

The illumination lamp is provided with a second illumination sliding groove 621 for angular adjustment and communication with the outside, and the first illumination sliding groove 620 and the second illumination sliding groove 621 communicate with each other, that is, positioned on the rear illumination cover 606 and the illumination housing 600.

The illumination circuit board 601 is further connected with a connector, and the lighting rear cover 606 is provided with a mounting port for mounting the connector, and a charging head matching the connector is further provided outside the illumination housing 600, the connector and the charging head may be magnetically sucked or snap-fitted.

The connector and the charging head are connected to each other, so that the electric energy in the power supply station is supplemented to the battery in the illumination lamp, thereby charging the battery in the illumination circuit board 601, and the battery in the illumination circuit board 601 supplies power to the illumination circuit board 601 for power supply, so as to realize illumination.

When the illumination lamp is used, the illumination lamp may be directly illuminated without being pushed out of the power supply station, or may be pushed out of the power supply station for illumination. When the illumination lamp is pushed out of the power supply station, the illumination lamp is inclined upward and abuts against with the power supply station. The illumination lamp may also be directly removed from the power supply station and used independently.

Figure 15:
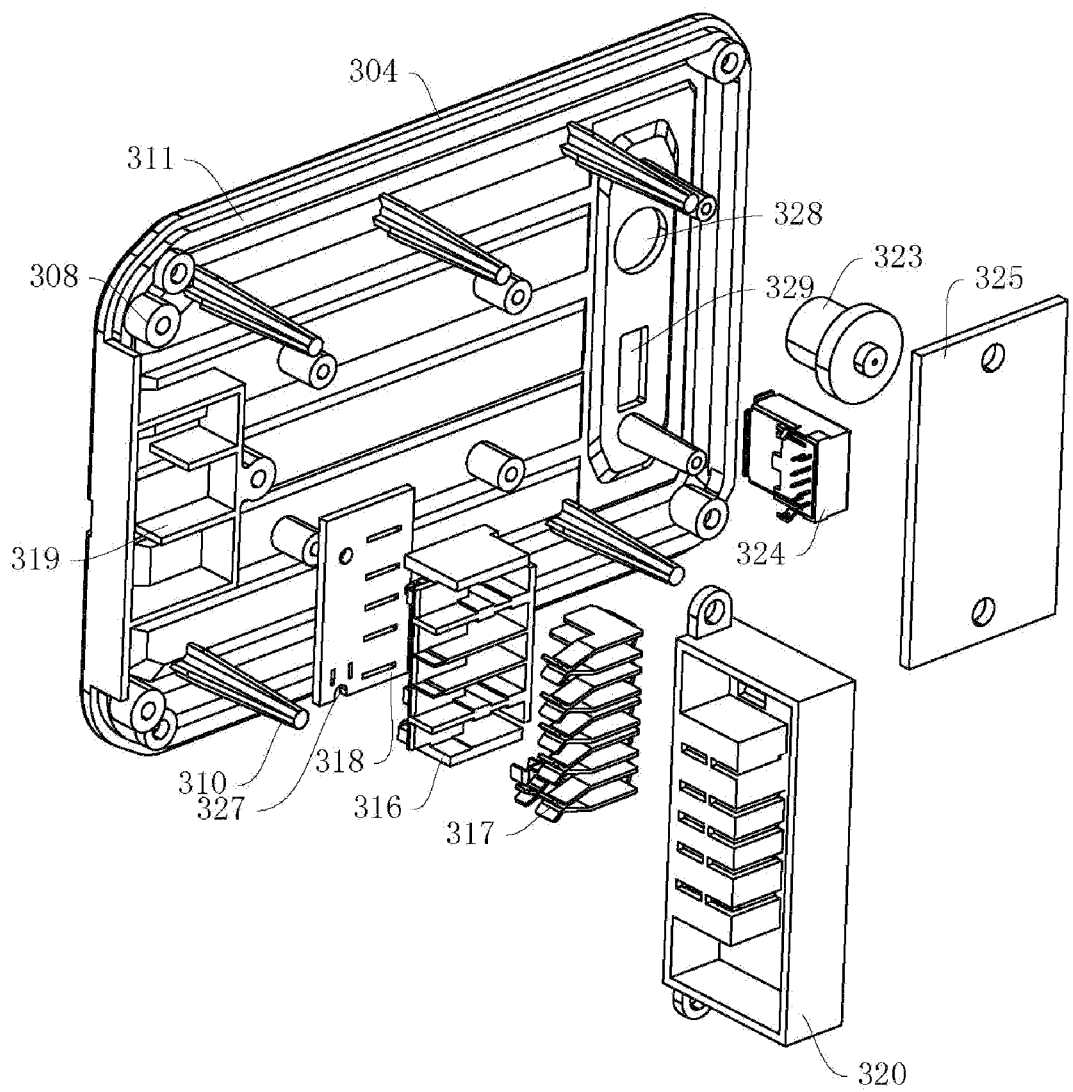
FIG. 15 is a second mounting schematic diagram of a lithium battery pack.
Figure 16:
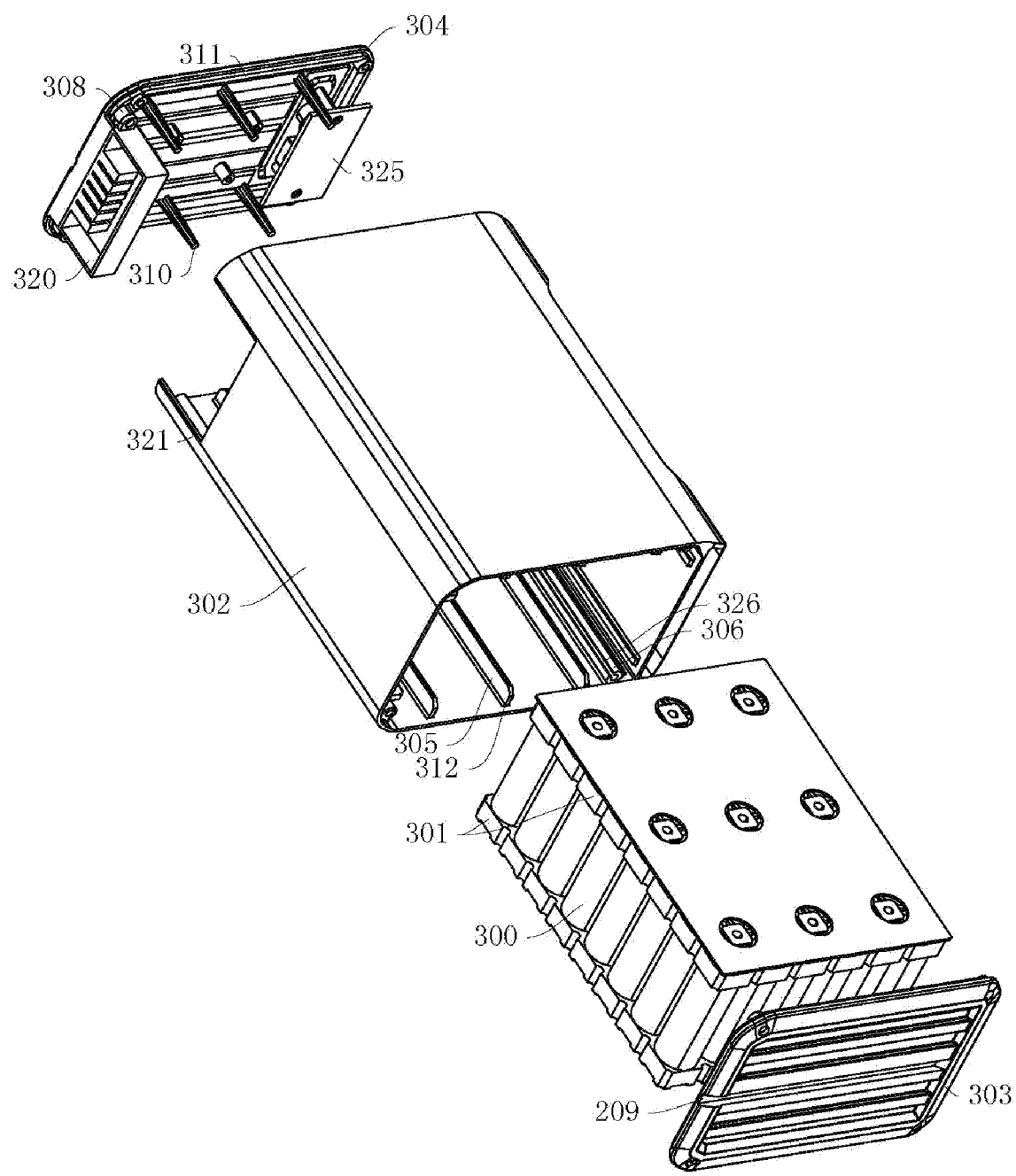
FIG. 16 is a third mounting schematic diagram of a lithium battery pack.

Referring to FIGS. 15 and 16, the lithium battery pack 3 includes a lithium battery pack, a housing 302, a lithium battery end cap assembly, a lithium battery connecting cover assembly, a lithium battery connecting strip 305, a lithium battery connecting cylinder 306, and a lithium battery guide surface 312. The lithium battery pack includes a lithium battery 300 and a lithium battery holder 301. The lithium battery pack 3 includes a lithium battery connecting frame 313 and a handle belt 314.

The lithium battery end cap assembly includes a lithium battery end cap 303, a first lithium battery connecting post 307, a second lithium battery connecting post 308, a first lithium battery top post 309 and a lithium battery connecting box 311.

The lithium battery connecting cover assembly includes a lithium battery connecting cover 304, a second lithium battery top post 310, a lithium battery connecting block 316, a lithium battery conductive sheet 317, a lithium battery insulation sheet 318, a lithium battery heat dissipation frame 319, a lithium battery base 320, a lithium battery placement groove 321, a lithium battery positioning post 322, a lithium battery charging head 323, a lithium battery output head 324 and a lithium battery circuit board 325.

Figure 14:
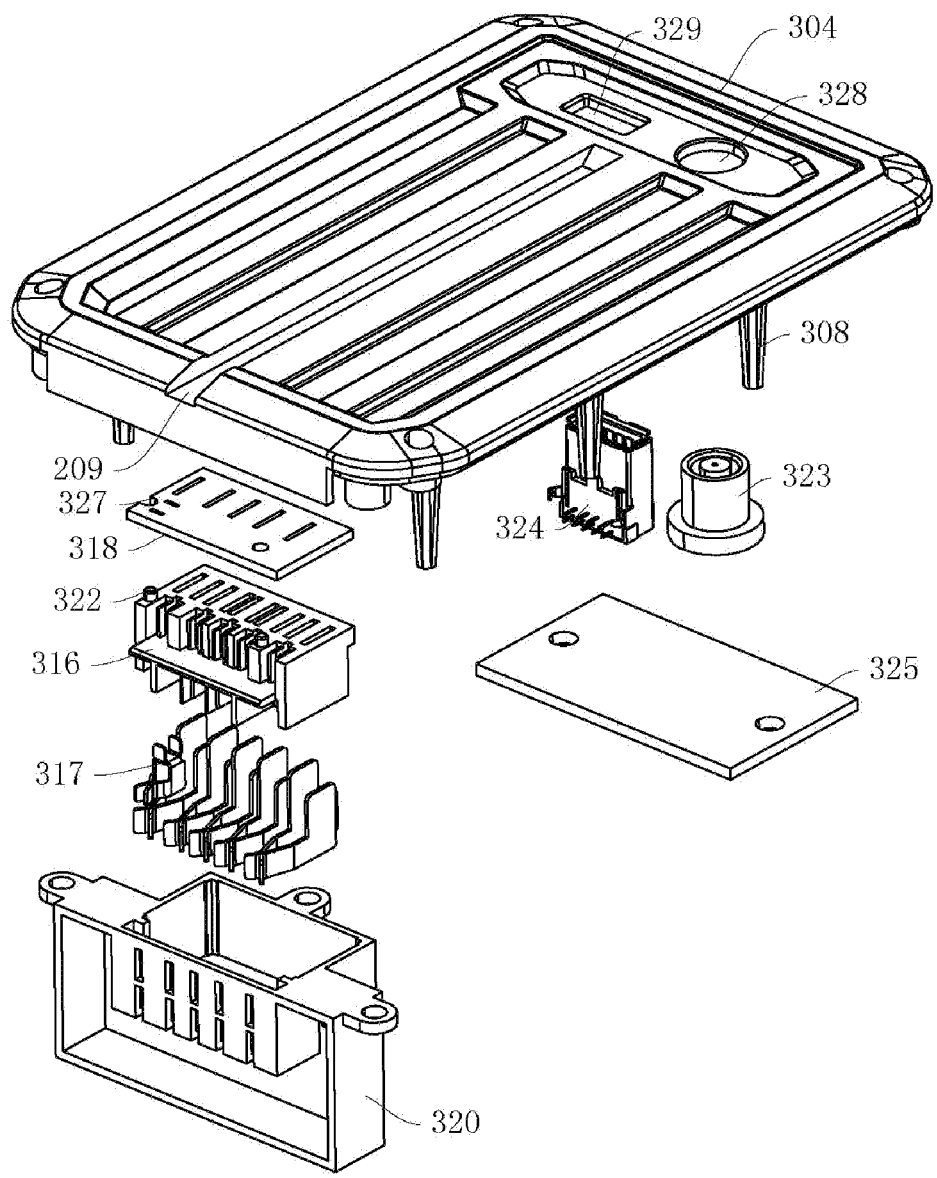
FIG. 14 is a first mounting schematic diagram of a lithium battery pack.

Referring to FIGS. 14 and 15, a lithium battery circuit board 325 is mounted on the lithium battery connecting cover 304, and a lithium battery charging head 323 and a lithium battery output head 324 are welded to the lithium battery circuit board 325. A first mounting port 328 for mounting the lithium battery charging head 323 is formed in the lithium battery connecting cover 304, and the external device charges the lithium battery pack 3 through the lithium battery charging head 323 in the first mounting port 328. The lithium battery connecting cover 304 is provided with a second mounting port 329 for mounting the lithium battery output head 324, and the external device is charged through the lithium battery output head 324 in the second mounting port 329. Furthermore, the lithium battery circuit board 325 is fixed to the lithium battery connecting cover 304 through bolts, so that the lithium battery output head 324 and the lithium battery charging head 323 are fixed.

A lithium battery connecting block 316 is further mounted on the lithium battery connecting cover 304, and the lithium battery connecting block 316 and the lithium battery circuit board 325 are mounted on the same side. Furthermore, a plurality of lithium battery conductive sheets 317 are inserted and fixed on the lithium battery connecting block 316, the number of the lithium battery conductive sheets 317 is adjusted by workers according to actual conditions, and the lithium battery conductive sheets 317 are connected with the outside through the lithium battery conductive sheets 317 so as to supply power to a power supply station, which belongs to the common knowledge of a person skilled in the art, and is not described herein.

In addition, a lithium battery insulating sheet 318 is further mounted between the lithium battery connecting cover 304 and the lithium battery connecting block 316, the lithium battery insulating sheet 318 is also inserted and fixed by the lithium battery conductive sheet 317, one side of the lithium battery connecting block 316 close to the lithium battery connecting cover 304 is provided with a lithium battery positioning post 322 protruding from the side of the lithium battery connecting block 316, and at least two blocks are provided; the lithium battery insulating sheet 318 is provided with a lithium battery positioning hole 327 for inserting and positioning the lithium battery positioning post 322, thereby improving the overall stability.

A lithium battery heat dissipation frame 319 is further disposed on one side of the lithium battery connecting cover 304 close to the lithium battery insulating sheet 318, and the lithium battery heat dissipation frame 319 is provided for erecting and fixing the lithium battery insulating sheet 318. The lithium battery connecting cover 304 is further fixed to the lithium battery base 320 by bolts, the lithium battery base 320 is configured to insert and mount the lithium battery conductive sheet 317, and the lithium battery base 320 covers the lithium battery insulating sheet 318 and the lithium battery connecting block 316, so that the external plug is electrically connected to the lithium battery base 320.

Figure 17:
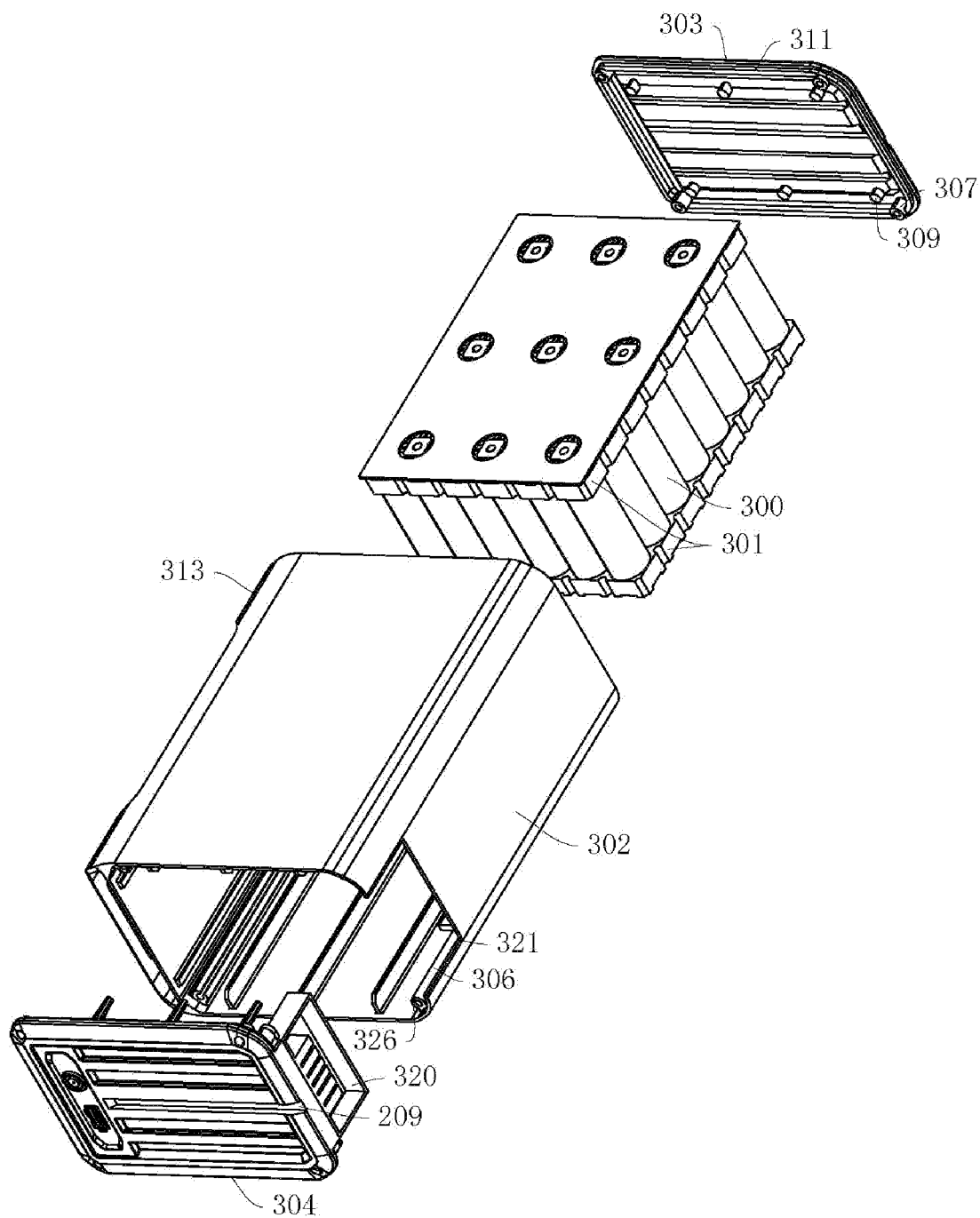
FIG. 17 is a fourth mounting schematic diagram of a lithium battery pack.

As shown in FIGS. 16 and 17, the housing 302 is further provided with a lithium battery placement groove 321 for mounting the lithium battery base 320, and the lithium battery end cap 303 and the lithium battery connecting cover 304 are both provided with a lithium battery connection box 311 inserted into the housing 302, so that the tightness between the lithium battery end cap 303 and the housing 302 is improved, and the tightness between the lithium battery connecting cover 304 and the housing 302 is also improved.

A lithium battery connecting strip 305 is disposed on the inner sidewall of the housing 302, and a plurality of lithium battery connecting strips 305 are disposed, and at least two lithium battery connecting strips 305 are disposed on the inner sidewall of each housing 302, thereby improving the overall stability, and if necessary, only one lithium battery connecting strip 305 may be disposed.

The lithium battery connecting strip 305 is used for allowing the lithium battery holder 301 with the lithium battery 300 arranged in the housing 302 to slide, so that the lithium battery holder 301 with the lithium battery 300 can be preliminarily fixed through the lithium battery connecting strip 305 when being mounted. The positive electrodes between the lithium batteries 300 are connected to each other, and the negative electrodes between the lithium batteries 300 are connected to each other, so that power is supplied, which belongs to the common knowledge of a person skilled in the art, and is not described herein.

In order to facilitate the sliding in of the lithium battery holder 301, the lithium battery connecting strip 305 is further provided with a lithium battery guide surface 312 for guiding the insertion of the lithium battery holder 301, and the number of the lithium battery guide surfaces 312 is set by workers according to actual requirements and is not repeated herein.

A plurality of lithium battery connecting cylinders 306 are integrally disposed on an inner side wall of the housing 302. The lithium battery connecting cylinders 306 are preferably disposed at the corners of the housing 302. A slit 326 communicating with the outside is further disposed on one side of the lithium battery connecting cylinders 306 away from the housing 302. The slit 326 is positioned on one side close to the lithium battery holder 301.

First lithium battery connecting post 307 in one-to-one correspondence with the lithium battery connecting cylinders 306 are integrally arranged on the lithium battery end cap 303, and second lithium battery connecting post 308 in one-to-one correspondence with the lithium battery connecting cylinders 306 are also integrally arranged on the lithium battery connecting cover 304. Therefore, the lithium battery end cap 303 and the housing 302 are fixed by bolts, and the lithium battery connecting cover 304 and the housing 302 are fixed by bolts.

One side of the lithium battery end cap 303 close to the housing 302 is integrally provided with a first lithium battery top post 309 pressing and abutting against one end of the lithium battery holder 301. One side of the lithium battery connecting cover 304 close to the housing 302 is integrally provided with a second lithium battery top post 310 which abuts against and presses the other end of the lithium battery holder 301, so as to press and fix both ends of the lithium battery holder 301.

Referring to FIG. 2, lithium battery connecting frames 313 are symmetrically arranged on the housing 302, the lithium battery connecting frames 313 are suspended and erected on the housing 302, a handle belt 314 is mounted on the lithium battery connecting frame 313, and lithium battery mounting grooves 315 allowing the handle belts 314 to be inserted and mounted are formed in the lithium battery connecting frames 313. The handle belt 314 may be a cord, or rubber or plastic, and fixed by adhesion.

Based on the same inventive concept, an embodiment of the present invention provides a charging and discharging method of a power supply station as described above, including the following steps:

Step 100, acquire current electric quantity information of each lithium battery 300 in the current lithium battery pack 3 and charging and discharging state information of the current lithium battery pack 3.

A lithium battery pack 3 is mounted in the power supply station, while a lithium battery pack 3 includes several lithium batteries 300, and each lithium battery 300 is detected by a sensor, thereby detecting current electric quantity information of each lithium battery 300.

Meanwhile, through the charging and discharging states of the lithium battery pack 3, the charging and discharging state information is determined.

Step 101, sort the current electric quantity information according to the electric quantity to obtain the lithium battery 300 corresponding to the highest electric quantity.

After collecting the electric quantity information in each lithium battery 300, the lithium battery 300 corresponding to the highest electric quantity is matched by sorting according to the electric quantity information. Each lithium battery 300 is identified by a serial number, and the serial number uniquely corresponds to the lithium battery 300, which facilitates identification.

Step 102, charge or power the lithium battery 300 corresponding to the highest electric quantity according to the charging and discharging state.

No matter whether the lithium battery 300 is in a charging state or a discharging state, the lithium battery 300 corresponding to the highest electric quantity is preferentially charged or powered to the lithium battery pack 3, and each battery is provided with an output plug capable of independently powering the lithium battery pack 3.

In particular, the method of acquiring charging and discharging state information of the current lithium battery pack includes the following steps:

Step 1020, acquire current trigger information of the current lithium battery pack, where the current trigger information includes charging trigger information and power supply trigger information.

The current trigger information of the current lithium battery pack 3 includes charging trigger information and power supply trigger information. Once the lithium battery 300 needs to be charged, the worker needs to insert an external plug, and then outputs charging trigger information for identification by the system. In addition, when the lithium battery 300 needs to be discharged, the worker needs to connect the lithium battery 300 with the outside so as to form a power supply circuit, and at this time, the power supply trigger information is outputted so as to provide system identification.

Step 1021, match a charging or discharging state from a preset state database according to the charging trigger information or the power supply trigger information.

According to the charging trigger information or the power supply trigger information, the charging and discharging state is matched from a state database, so that the charging and discharging state information is matched, the state database is a preset database, and is identified by comparing the state information.

Step 103, if a plurality of lithium batteries 300 corresponding to the highest electric quantity are provided, then sort charging or discharging time points of the lithium batteries 300, and preferentially charging and discharging the lithium battery 300 with the longest time point from the current time point.

Once a plurality of lithium batteries 300 corresponding to the highest electric quantity are provided, the time points of charging or discharging of the selected plurality of lithium batteries 300 are sorted, and the lithium battery 300 having the longest time point from the current time point, i.e., the lithium battery 300 having the longest time point is charged and discharged preferentially, so that the temperature rise is reduced.

What is claimed is:

1. A power supply station, comprising:
   a base assembly, configured to mount an end cap assembly and a connecting assembly;
   the connecting assembly, disposed on the base assembly, configured to insert the lithium battery pack therein and electrically connect the lithium battery pack, and configured to distribute energy from the lithium battery pack;
   the lithium battery pack, slidably connected to the connecting assembly, and configured to provide electrical energy;
   the end cap assembly, disposed on the base assembly, and configured to fix the connecting assembly; and
   a locking assembly, disposed on the connecting assembly, and configured to lock the lithium battery pack,
   wherein the conductive assembly comprises:
   a connecting plate, fixed to one side of the connecting box close to the end cap assembly by bolts, and configured to place a connecting circuit board;
   the connecting circuit board, fixedly connected to the connecting plate by bolts;
   a connecting plug, disposed on the connecting box, connected with the lithium battery pack by insertion, and connected to the connecting circuit board;
   a connecting conductive sheet, disposed on the connecting plug, communicated with the lithium battery pack by insertion;
   a connection positioning strip, disposed on one side of the connecting plug away from the connecting box; and
   a connection mounting cover, disposed on one side of the mounting box away from the lithium battery pack, and configured to cover the connecting plug;
   the connecting box being formed with a connecting receptacle, for inserting and limiting the connecting plug, and the connection mounting cover being formed with a connection positioning groove, for mounting the connection positioning strip.

2. The power supply station according to claim 1, wherein the connecting assembly comprises:
   a connecting box, disposed on the base assembly, and configured to insert and mount the lithium battery pack therein;
   a connecting pin, disposed on the connecting box, fixed to the base assembly by bolts and erected on the base assembly;
   a conductive assembly, disposed on the connecting box, and configured to connect the lithium battery pack;
   connecting sliders, symmetrically disposed on inner side walls of the connecting box and slidably connected to the lithium battery pack; and
   sliding connection grooves provided on two sides of the lithium battery pack for slidably connecting the connecting sliders.

3. The power supply station according to claim 1, wherein the base assembly comprises:
   a base shell, configured to mount a connecting assembly and an end cap assembly;
   a display panel, disposed on one side of the base shell close to the lithium battery pack, and configured for displaying data;
   base bottom sheets, symmetrically disposed on one side of the base shell away from the end cap assembly;
   base snap rings, symmetrically disposed on one side of the base bottom plate close to the base shell, and snap-fitted with base snap blocks;
   the base snap blocks, disposed on the base shell, and snap-fitted with the base snap rings;
   a base connecting cylinder, disposed on the base shell, and fixedly connected to the connecting pin by bolts;
   a base fixing cylinder, disposed on the base shell, and fixedly connected to the end cap assembly by bolts;
   a base buckle, disposed on one side of the base shell close to the end cap assembly, snap fixed to the end cap assembly; and
   a base insertion edge, disposed on one side of the base shell close to the end cap assembly, and inserted into the end cap assembly;
   the base shell being formed with a base slot, for inserting the base bottom sheet.

4. The power supply station according to claim 3, wherein the display panel comprises:
   a base circuit board, disposed on one side of the base shell close to the lithium battery pack;
   a light-transmitting cover, disposed on one side of the base shell away from the lithium battery pack, and configured to cover a light-transmitting hole and correspond to the base circuit board to display the base circuit board;
   a base plug, snapped into the base shell and connected to the base circuit board;
   a base dust cover, snap fixed to the base shell, and configured to cover a base connecting hole;
   a base button, slidably limited on the base shell and configured to correspond to the base circuit board;
   the base shell being provided with the light-transmitting hole, the base shell being formed with a base snap slot for snap-fitting the base plug, the base shell being further provided with the base connecting hole for communicating with the base circuit board, the base shell being provided with a base sliding hole for sliding and limiting the base button, and the base shell being further provided with a heat dissipating hole for communicating with the outside.

5. The power supply station according to claim 2, wherein the end cap assembly comprises:

an end shell, configured to insert and fix the base insertion edge, and configured to press and abut against the base shell;

an end cap fixing cylinder, disposed on one side of the end shell close to the base shell, and fixedly connected to the base fixing cylinder by bolts; and an end cap snap block, disposed on the end shell, and snap fixed to the base buckle.

6. The power supply station according to claim 5, wherein the end cap assembly further comprises:

an end cap charging head, configured to charge the lithium battery pack, and limited and fixed to the end shell;

an end cap mounting plate, disposed on one side of the end shell close to the end cap charging head, and configured to press and fix the end cap charging head;

an end cap positioning post, disposed on one side of the end cap charging head close to the end cap mounting plate, and disposed through and fixed to the end cap mounting plate;

an end cap mounting box, disposed on one side of the end shell close to the base shell, configured to mount the end cap plug, and fixed to the end shell by bolts;

an end cap plug, disposed in the end cap mounting box;

the end shell being formed with an end cap mounting slot, for inserting and limiting the end cap charging head, and the end shell being formed with an end cap receptacle, for inserting the end cap plug.

7. The power supply station according to claim 5, wherein the end cap assembly further comprises:

an end cap connecting base, disposed on one side of the end shell close to the base shell, and configured to penetrate through and mount an end cap connecting bolt;

the end cap connecting bolt, configured to fixedly connect handle mounting seat and the end cap connecting base;

an end cap pressure spring, sleeved on the end cap connecting bolt, and configured to press and abut against the end cap connecting bolt and the end cap connecting base, respectively;

an end cap handle, disposed on one side of the end shell away from the base shell and held by the hand;

an end cap handle plate, snapped onto one side of the end cap handle close to the end shell;

a handle buckle, disposed on one side of the end cap handle plate close to the end cap handle;

a handle snap block, disposed on the end cap handle, and snap fixed to the handle buckle; and the handle mounting seat, disposed on the end cap handle and cooperating with the end cap connecting base;

one side of the end shell away from the base assembly being further formed with an end cap placement groove for mounting the end cap handle.

8. The power supply station according to claim 1, wherein the locking assembly comprises:

a locking block, disposed on the base shell, and configured to lock the lithium battery;

a locking cover, disposed on the base shell, and configured to limit the sliding position of the locking block;

a locking tab, disposed on both sides of the locking cover and configured to mutually limit the base shell;

a locking slider, disposed on the base shell and positioned in a locking sliding groove;

a locking sliding cylinder, disposed on one side of the locking slider away from the base shell, and configured to mount the locking pressure spring, and configured to slide and fit a locking sliding column;

the locking sliding column, disposed on one side of the locking cover close to the base shell;

a locking pressure spring, positioned between the locking sliding column and the locking sliding cylinder, and driving the locking block to move towards the direction of the lithium battery pack;

a locking indicator block, disposed on the locking block, positioned in a gripping groove, and configured to indicate a direction in which the locking block is disengaged from the lithium battery pack;

the gripping groove being provided on one side of the locking block close to the base shell, the base shell being provided with the locking sliding groove for sliding the slider, and the locking block being formed with a movement locking groove for sliding the locking slider.

9. The power supply station according to claim 1, further comprising: an illumination assembly connected to the end cap assembly and configured to adjust an irradiation angle.

10. The power supply station according to claim 9, wherein the illumination assembly comprises:

an illumination housing, disposed on one side of the end shell away from the base shell;

an illumination circuit board, disposed in the illumination housing and configured for illumination;

a first light-transmitting sheet, disposed on the illumination housing and configured to cover a first irradiation port;

an illumination fixing sheet, erected on and fixed to the first irradiation port;

an illumination positioning post, disposed on one side of the illumination housing close to the first illumination port;

an illumination insertion sheet, disposed on the illumination housing, and configured to insert and fix the illumination circuit board;

a rear illumination cover, disposed on one side of the illumination housing away from the first light-transmitting sheet;

an illumination threaded cylinder, disposed on the rear illumination cover and the illumination housing respectively in one-to-one correspondence;

an illumination buckle, disposed on the illumination housing;

an illumination snap ring, disposed on the rear illumination cover, and snap fixed to the illumination buckle;

an illumination connecting edge, disposed on one side of the illumination housing close to the rear illumination cover;

an illumination socket, disposed on the illumination circuit board and communicated with the end cap charging head;

the illumination housing being provided with a first irradiation port irradiating forward, the first irradiation port and the second irradiation port being communicated with each other, the illumination fixing sheet being provided with an illumination positioning hole for penetrating through the illumination positioning post, the rear illumination cover being formed with an illumination connecting groove for inserting the illumination connecting edge, and the rear illumination cover being formed with an illumination through hole for mounting the illumination socket.

11. The power supply station according to claim 10, wherein the illumination assembly further comprises:

a second light-transmitting sheet, integrally disposed with the first light-transmitting sheet and disposed on the illumination housing and configured to cover the second illumination port;
an illumination handle, disposed on the illumination housing;
illumination connection posts, symmetrically disposed on the end shell;
the illumination housing being provided with a second irradiation port irradiating downward, and the illumination fixing sheet being erected on the second illumination port and the first illumination port, the illumination housing being formed with a first illumination sliding groove for sliding the illumination connection post, the illumination housing being formed with a second illumination sliding groove for angular adjustment and communicating with the outside, and the first illumination sliding groove and the second illumination sliding groove are communicated with each other.

12. The power supply station according to claim 1, wherein the lithium battery pack comprises:
a lithium battery pack, configured to supply power and charge;
a housing, configured to insert and place the lithium battery pack therein;
a lithium battery end cap assembly, disposed at one end of the housing and connected to the lithium battery pack;
a lithium battery connecting cover assembly, disposed at the other end of the housing;
a lithium battery connecting cylinder, disposed on the housing;
a lithium battery connecting strip, disposed on one side of the housing close to the lithium battery pack, and configured to erect and slide the lithium battery pack; and
a lithium battery guide surface, disposed on the lithium battery connecting strip, and configured to guide insertion of the lithium battery holder;
a slit being provided on one side of the lithium battery connecting cylinder close to the lithium battery holder.

13. The power supply station according to claim 12, wherein the lithium battery pack comprises:
a lithium battery, configured to supply power and charge;
a lithium battery holder, configured to place and connect the lithium battery.

14. The power supply station according to claim 12, wherein the lithium battery end cap assembly comprises:
a lithium battery end cap, disposed at one end of the housing;
a first lithium battery connecting post, disposed on the lithium battery end cap and in one-to-one correspondence with the lithium battery connecting cylinder;
a second lithium battery connecting post, disposed on the lithium battery end cap and in one-to-one correspondence with the lithium battery connecting cylinder;
a first lithium battery top post, disposed on the lithium battery end cap, and configured to press and abut against one end of the lithium battery holder;
a lithium battery connecting block, disposed on the lithium battery end cap and the lithium battery connecting cover assembly, and configured to insert into the housing.

15. The power supply station according to claim 12, wherein the lithium battery connecting cover assembly comprises:
a lithium battery connecting cover, disposed at the other end of the housing;
a second lithium battery top post, disposed on the lithium battery connecting cover, and configured to press and abut against the other end of the lithium battery holder;
a lithium battery connecting block, disposed on one side of the lithium battery connecting cover close to the lithium battery;
a lithium battery conductive sheet, inserted and fixed to the lithium battery connecting block;
a lithium battery insulating sheet, disposed between the lithium battery connecting block and the lithium battery connecting cover;
a lithium battery heat dissipation frame, disposed on one side of the lithium battery connecting cover close to the lithium battery conductive sheet, and configured to erect the lithium battery insulation sheet thereon;
a lithium battery base, disposed on the lithium battery connecting block and configured to insert the lithium battery conductive sheet therein;
a lithium battery positioning post, disposed on one side of the lithium battery connecting block close to the lithium battery connecting cover;
a lithium battery charging head, disposed on the lithium battery connecting cover;
a lithium battery output head, disposed on the lithium battery connecting cover;
a lithium battery circuit board, disposed on the lithium battery connecting cover and connected to the lithium battery charging head and the lithium battery output head;
the housing being provided with a lithium battery placement groove for mounting the lithium battery base, the lithium battery insulating sheet being formed with a lithium battery positioning hole for inserting and positioning the lithium battery positioning post, the lithium battery connecting cover is provided with a first mounting port for mounting a lithium battery charging head; and the lithium battery connecting cover is provided with a second mounting port for mounting the lithium battery output head.

16. The power supply station according to claim 12, wherein the lithium battery pack further comprises:
a lithium battery connecting frame, symmetrically disposed on the housing;
a handle belt, disposed on the lithium battery connecting frame;
the lithium battery connecting frame being provided with a lithium battery mounting groove for inserting and mounting the handle belt therein.

17. A charging and discharging method of the power supply station according to claim 1, further comprising the following steps of:
acquiring current electric quantity information of each lithium battery in the current lithium battery pack and charging and discharging state information of the current lithium battery pack;
sorting the current electric quantity information according to the electric quantity to obtain a lithium battery corresponding to the highest electric quantity; and
charging or powering the lithium battery corresponding to the highest electric quantity according to the charging and discharging state;
if a plurality of lithium batteries corresponding to the highest electric quantity are provided, then sorting charging or discharging time points of the lithium batteries, and preferentially charging and discharging the lithium battery with the longest time point from the current time point.

18. The power supply station charging and discharging method according to claim 17, wherein, the acquiring charging and discharging state information of the current lithium battery pack comprises:

acquiring current trigger information of the current lithium battery pack, wherein the current trigger information comprises charging trigger information and power supply trigger information; and matching a charging or discharging state from a preset state database according to the charging trigger information or the power supply trigger information.

\* \* \* \* \*